US006877091B2

United States Patent
Nomizo et al.

(10) Patent No.: US 6,877,091 B2
(45) Date of Patent: Apr. 5, 2005

(54) ACTUATION OF PROJECTOR BY SYSTEM STORED IN MOBILE MEMORY

(75) Inventors: Tomohiro Nomizo, Shiojiri (JP); Shoichi Akaiwa, Matsumoto (JP); Miki Nagano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 10/019,647

(22) PCT Filed: Jul. 11, 2001

(86) PCT No.: PCT/JP01/06025

§ 371 (c)(1),
(2), (4) Date: Jan. 3, 2002

(87) PCT Pub. No.: WO02/06893

PCT Pub. Date: Jan. 24, 2002

(65) Prior Publication Data

US 2003/0074536 A1 Apr. 17, 2003

(30) Foreign Application Priority Data

Jul. 18, 2000 (JP) ........................................ 2000-217439

(51) Int. Cl.[7] ............................ G06F 9/02; G06F 9/04; G06F 9/455
(52) U.S. Cl. ............................ 713/2; 710/13; 711/103; 711/115
(58) Field of Search ............................. 713/2; 710/13; 711/103, 115; 235/492

(56) References Cited

U.S. PATENT DOCUMENTS 5,471,674 A * 11/1995 Stewart et al. .................. 713/2

FOREIGN PATENT DOCUMENTS

| EP | 0 793 166 A2 | 9/1997 |
|---|---|---|
| JP | A 3-38687 | 2/1991 |
| JP | A 5-142652 | 6/1993 |
| JP | A 6-318056 | 11/1994 |
| JP | A 10-21068 | 1/1998 |
| JP | A 10-133276 | 5/1998 |
| JP | A 11-143782 | 5/1999 |
| JP | A 2000-311087 | 11/2000 |

* cited by examiner

*Primary Examiner*—Jack A. Lane
(74) *Attorney, Agent, or Firm*—Oliff & Berridge, PLC

(57) ABSTRACT

A projector including a computer has: an internal storage device that stores therein a basic system, which is executed first by the computer on actuation of the projector, and a first control system that is activated through processing of the basic system to control operations of the projector; and a memory controller that reads information stored in a mobile memory. On actuation of the projector, the basic system reads information stored in a specific area of the mobile memory attached to the memory controller prior to activation of the first control system, identifies whether or not the information in the specific area is a specific piece of information, and, when the information in the specific area is identified as the specific piece of information, activates a second control system stored in the mobile memory, in place of the first control system. This arrangement enables the projector to utilize a new operating system.

13 Claims, 4 Drawing Sheets

ACTUATION OF PROJECTOR BY SYSTEM STORED IN MOBILE MEMORY

TECHNICAL FIELD

The present invention relates to a technique of actuating a projector by a system stored in a mobile memory and controlling operations of the projector.

BACKGROUND ART

A projector used for projection of images is a type of computer system. Like the general computers, the projector is under the control of an operating system and is operated through execution of diverse application programs.

On actuation of the projector, the operating system stored in its internal storage device is inevitably executed. Execution of a new operating system is thus not allowed to control the operations of the projector. There has accordingly been a growing demand for utilization of the new operating system.

The object of the present invention is thus to solve the above drawback of the prior art and to provide a technique that enables a projector to utilize a new operating system.

DISCLOSURE OF THE INVENTION

At least part of the above and the other related objects is attained by a projector including a computer, which includes: an internal storage device that stores therein a basic system, which is executed first by the computer on actuation of the projector, and a first control system that is activated through processing of the basic system to control operations of the projector; and a memory controller that reads information stored in a mobile memory. On actuation of the projector, the basic system reads information stored in a specific area of the mobile memory attached to the memory controller prior to activation of the first control system, identifies whether or not the information in the specific area is a specific piece of information, and, when the information in the specific area is identified as the specific piece of information, activates a second control system stored in the mobile memory, in place of the first control system.

The 'basic system' of the present invention represents a basic input output system (BIOS) of the computer, and the 'control system' represents an operating system (OS) of the computer. The 'operating system' is not restricted to the general purpose operating system or driver used in the personal computer but includes a specific operating system provided for controlling operations of the projector.

The arrangement of the present invention enables the second control system stored in the mobile memory (external storage device) to be activated in place of the first control system stored in the internal storage device on actuation of the projector and thereby control the operations of the projector.

In one preferable application of the present invention, the second control system updates the first control system stored in the internal storage device according to updating information for the first control system stored in the mobile memory, after activation of the second control system.

This arrangement enables the first control system stored in the internal storage device to be readily updated.

It is preferable that the specific area is set in a write protection area of the mobile memory.

The specific piece of information can thus not be stored in the specific area of a conventional mobile memory. This arrangement prevents the second control system stored in the conventional mobile memory from being executed to control the operations of the projector. Only authenticated users who obtain permission to write data into the specific area can prepare a mobile memory usable for actuation of the projector. This arrangement allows only the users having the mobile memory with the specific piece of information stored in the specific area (that is, the specific mobile memory) to control the operations of the projector according to the control system stored in the mobile memory. The arrangement thus effectively prevents any illegal user without the specific mobile memory from controlling the operations of the projector according to any control system that is different from the first control system stored in the internal storage device without permission.

It is further preferable that the specific area is set in a non-defined area in a specification of memory structure specified according to a type of the mobile memory.

The present invention is also directed to a method of actuating a projector, which includes the steps of on actuation of the projector, reading information stored in a specific area of a mobile memory attached to the projector, prior to activation of a first control system for controlling operations of the projector; identifying whether or not the information in the specific area is a specific piece of information; and when the information in the specific area is identified as the specific piece of information, activating a second control system stored in the mobile memory, in place of the first control system.

This method exerts the same functions and effects as those of the projector discussed above.

The present invention is further directed to a mobile memory detachably attached to a projector. The mobile memory has a data area that stores therein a second control system, which is capable of controlling operations of the projector, in place of a first control system for controlling the operations of the projector. The mobile memory also has a specific area that stores therein a specific piece of information, which is read out prior to activation of the first control system on actuation of the projector and directs to activate the second control system in place of the first control system.

Application of this mobile memory to the projector of the present invention exerts the same functions and effects as those of the projector discussed above.

BEST MODE OF CARRYING OUT THE INVENTION

Figure 1:
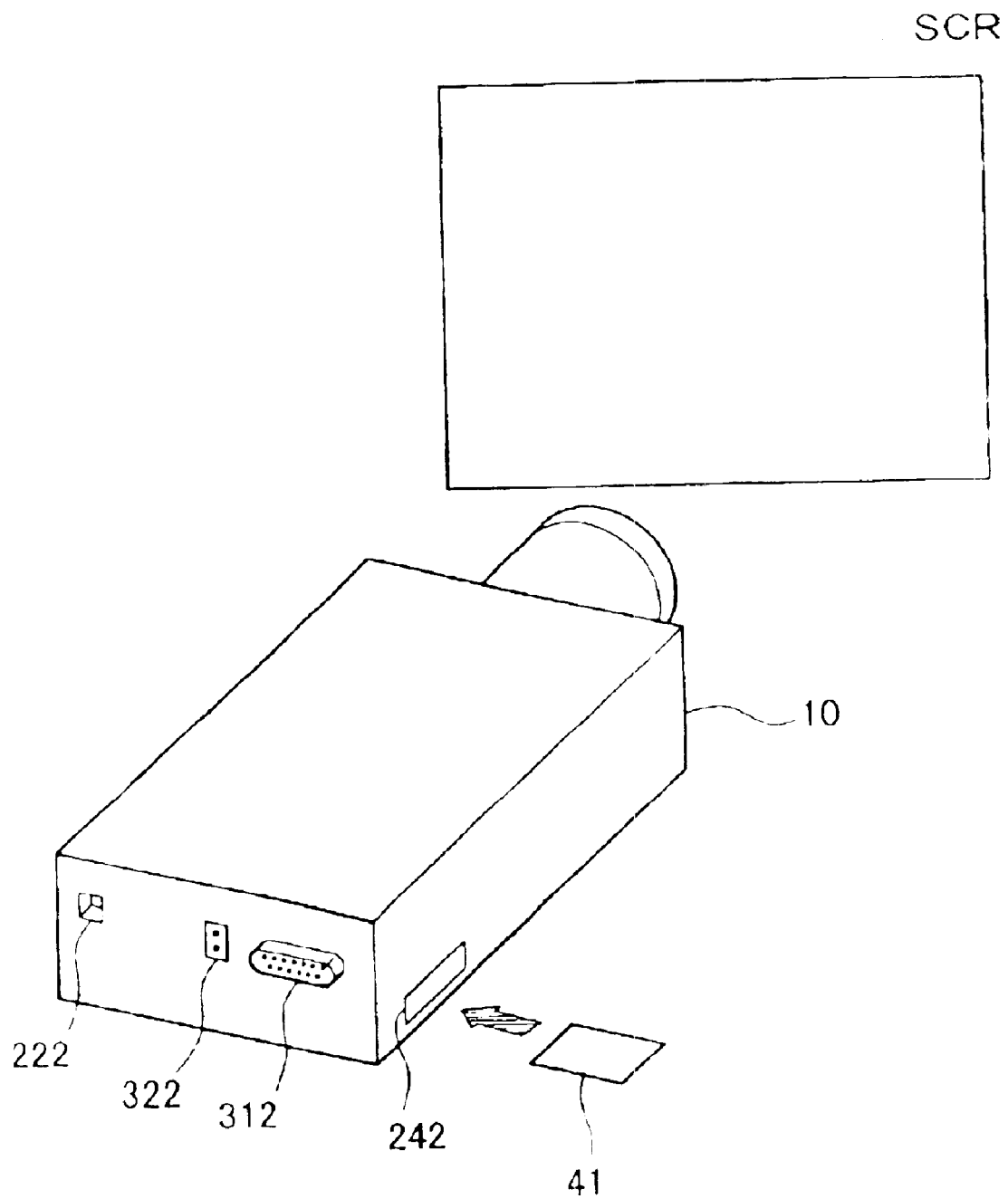
FIG. 1 illustrates a projector in one embodiment of the present invention.

One mode of carrying out the present invention is discussed below in the following sequence as a preferred embodiment:

A. Structure of Projector
B. Basic Operations of Projector
C. System Updating Control
D. Modifications
A. Structure of Projector FIG. 1 illustrates a projector in one embodiment of the present invention. This projector 10 has an external video signal input terminal 312 connectable with an image supply device, such as a personal computer or a video recorder, and a card slot 242 receiving a PC card 41 inserted therein. The projector 10 projects an image supplied from a non-illustrated image supply device via the external video signal input terminal 312 onto a projection screen SCR. Insertion of the PC card 41 into the card slot 242 enables the projector 10 to read information from the PC card 41 and write various pieces of information into the PC card 41. The projector 10 also has an external audio input terminal 322 and a network connection terminal 222.

Figure 2:
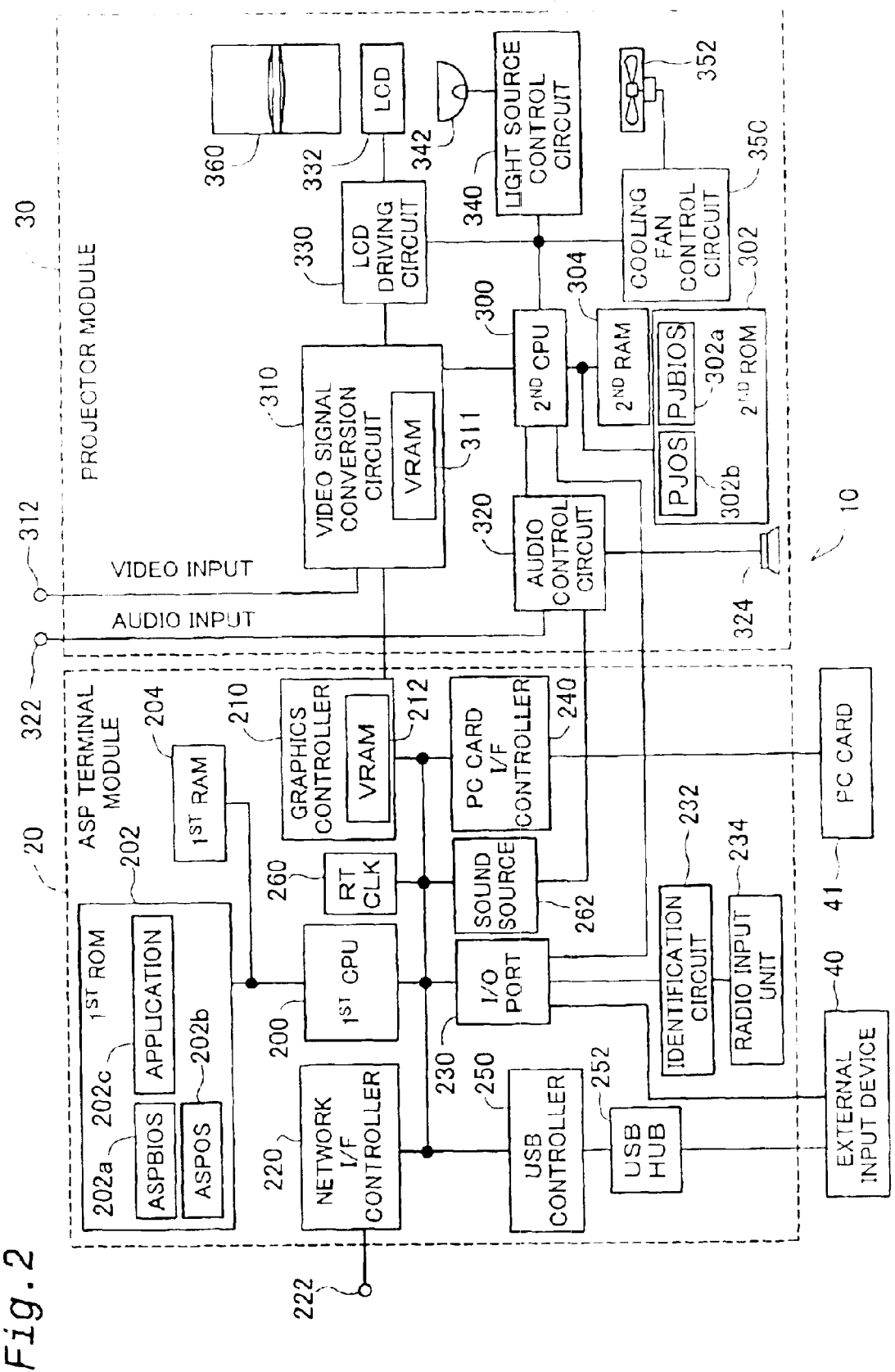
FIG. 2 is a block diagram illustrating the internal structure of the projector in the embodiment.

FIG. 2 is a block diagram illustrating the internal structure of the projector in the embodiment. The projector 10 includes two computers, an ASP terminal module 20 mainly having the similar functions to those of a general computer and a projector module 30 mainly having the similar functions to those of a conventional projector.

The ASP terminal module 20 includes a first central processing unit (CPU) 200 executing diverse operations, a first read only memory (ROM) 202, and a first random access memory (RAM) 204. Connection between the first CPU 200 and the first ROM 202 and connection between the first CPU 200 and the first RAM 204 allow two-way communications. The first CPU 200 carries out a diversity of operations. An ASPBIOS 202a as the basic input output system of the ASP terminal module 20, an operating system (hereinafter referred to as 'ASPOS') 202b, and a variety of application programs 202c are stored in the first ROM 202. Results of the operations by the first CPU 200 and data are temporarily registered in the first RAM 204. A flash ROM or an electrically rewritable, non-volatile memory like an EEPROM may be applied for the first ROM 202.

The ASP terminal module 20 is connected to the first CPU 200 to allow two-way communication, and includes a graphics controller 210 that generates image data in response to a drawing instruction output from the first CPU 200. The graphics controller 210 has an LSI chip (not shown) for generating images and a first frame memory (VRAM) 212 for storing resulting generated images (displayed images) therein.

The ASP terminal module 20 includes a network interface controller 220, an I/O port 230, a PC card interface controller 240, and a USB controller 250 as interfaces used for transmission of commands and data between the projector 10 and an external device. The network interface controller 220 is, for example, a controller in conformity with the Ethernet standard. The network interface controller 220 converts commands and data, which are to be transmitted from the ASP terminal to a non-illustrated network line via a network connection terminal 222 into an adequate format according to a protocol of network communications, or converts signals transmitted from the network line into a format suitable for the processing in the ASP terminal module 20. The I/O port 230 is a standard input-output port, and is connected to a radio input unit 234 via an identification circuit 232 while being connected to an external input device 40 and a second CPU 300 of the projector module 30. The radio input unit 234 receives input data transmitted from a radio input device by radio. The identification circuit 232 identifies whether or not input data received by the radio input unit 234 is data addressed to the ASP terminal module 20.

The PC card interface controller 240 is connected to an external device, such as the PC card 41 inserted in the card slot 242 (see FIG. 1), and takes charge of data transfer from the ASP terminal module 20 to the external device and from the external device to the ASP terminal 20 according to the PCMCIA standard. In this embodiment, among PC cards in conformity with the PCMCIA standard, a PC card of ATA (AT Attachment) specification is applied, although the specification of the PC card is not restricted to ATA. The USB controller 250 connects with an external device, such as the external input device 40, for example, via a USBHUB 252 and takes charge of data transfer between the ASP terminal 20 and the external device according to the USB standard.

The ASP terminal module 20 further includes a real time clock 260 that counts the absolute time in the ASP terminal 20 and a sound source 262 that generates sound data in response to instructions from the first CPU 200.

The first CPU 200 and the respective controllers 210, 220, 240, and 250 in the ASP terminal module 20 are mutually connected via a bus, through which data and commands are transmitted.

Like the general computer, the ASP terminal module 20 is controlled through execution of the ASPBIOS 202a and the ASPOS 202b stored in the first ROM 202 by the first CPU 200, which leads to execution of the diverse application programs 202c.

The projector module 30 includes a second central processing unit (CPU) 300, a second read only memory (ROM) 302, and a second random access memory (RAM) 304. Connection between the second CPU 300 and the second ROM 302 and connection between the second CPU 300 and the second RAM 304 allow two-way communications. The second CPU 300 is connected with the first CPU 200 via the I/O port 230 to allow two-way communication, so that data and commands are transmittable between the first CPU 200 and the second CPU 300. The second CPU 300 executes predetermined programs to control the respective circuits in the projector module 30. A PJBIOS 302a as the basic input output system of the projector module 30 functioning as the computer and an operating system (hereinafter referred to as 'PJOS') that is executed by the second CPU 300 to control the respective circuits of the projector module 30. Results of the operations by the second CPU 300 and data are temporarily registered in the second RAM 304.

The projector module 30 further includes a video signal conversion circuit 310, an audio control circuit 320, a liquid crystal panel (LCD) driving circuit 330, a light source control circuit 340, a cooling fan control circuit 350, and a projection optical system 360.

The video signal conversion circuit 310 exerts a function of analog-digital conversion, a decoding function, a function of synchronizing signal separation, and an image processing function. Namely the video signal conversion circuit 310 converts analog video signals input from the external video signal input terminal 312 into digital video data, and writes the converted digital video data into a second frame memory (VRAM) 311 included in the video signal conversion circuit 310 or reads the stored digital video data from the second frame memory 311 in synchronism with a synchronizing signal. The input analog video signals may be, for example, RGB signals output from a personal computer and composite video signals output from a video cassette recorder. When the analog video signal is a composite video signal, the video signal conversion circuit 310 demodulates the composite video signal, separates a component video signal consisting of three RGB color signal components from a synchronizing signal, and converts the component video signal into digital video data. When the analog video signal is an RGB signal output from the personal computer, the synchronizing signal separation process is not required, since the RGB signal is a component video signal and is input separately from the synchronizing signal. The video signal conversion circuit 310 thus simply converts the component video signal into digital video data.

The video signal conversion circuit 310 also receives digital video signals transmitted from the graphics controller 210 of the ASP terminal module 20. In this case, the analog-digital conversion process and the synchronizing signal separation process are not required, since the digital video signals are supplied separately from the synchronizing signal.

The video signal conversion circuit 310 has a non-illustrated selection circuit to select one of multiple input video signals and store the selected video signal into the second frame memory 311. The selection of the video signal is carried out, for example, in response to an instruction output from the external input device 40.

The audio control circuit 320 is connected to the external audio signal input terminal 322, a speaker 324, the second CPU 300, and the sound source 262 of the ASP terminal module 20. The audio control circuit 320 generates a driving signal based on an audio signal or sound data transferred from the external audio signal input terminal 322 or the sound source 262 in response to an instruction output from the second CPU 300, and actuates the speaker 324 with the generated driving signal.

The liquid crystal panel driving circuit (LCD driving circuit) 330 receives video data processed by the video signal conversion circuit 310 and drives a liquid crystal panel (LCD) 332 according to the input video data to modulate a light beam emitted from a light source 342. The light beam modulated by the LCD 332 is projected on a projection surface, for example, a projection screen, via a projection optical system 360 including lenses. The light source 342 is connected to the light source control circuit 340, which regulates the on-off state and the quantity of light of the light source 342 in response to an instruction output from the second CPU 300. A cooling fan 352 is disposed behind the light source 342 to blast the cooling air against the light source 342. The cooling fan 352 is connected to the cooling fan control circuit 350, which regulates the on-off state and the rotational speed of the cooling fan 352 in response to an instruction output from the second CPU 300.

In the projector module 30, the second CPU 300 executes the PJBIOS 302a and the PJOS 302b stored in the second ROM 302 to attain diverse controls.

It is desirable that the ASP terminal module 20 is mounted, for example, on one printed wiring board to allow arbitrary attachment to and detachment from the projector. As clearly understood from the structure of FIG. 2, this projector is capable of projecting and displaying images in response to externally supplied video signals even in the non-attachment state of the ASP terminal module 20. The arbitrary attachment and detachment of the ASP terminal module 20 to and from the projector facilitates construction of both a projector with the functions of the ASP terminal module 20 (that is, the ASP terminal functions and drawing functions discussed later) and a projector without the functions of the ASP terminal module 20.

B. Basic Operations of Projector

A signal input from the network input terminal 222 to the projector 10 via the network line is converted into a specific format suitable for he ASP terminal module 20 by the network interface controller 220 of the ASP terminal module 20, and is transferred as data and a command to the first CPU 200. The first CPU 200 temporarily registers the transferred data into the first RAM 204 and identifies whether the transferred command is a command addressed to the ASP terminal module 20 or a command addressed to the projector module 30. When the transferred command is a command addressed to the projector module 30, the first CPU 200 further transfers the command to the second CPU 300 in the projector module 30 via the I/O port 230.

When the transferred command is a command addressed to the Asp terminal module 20, on the other hand, the first CPU 200 carries out an operation based on the transferred command. For example, the first CPU 200 reads a viewer application suitable for the data stored in the first RAM 204, activates the viewer application to generate user interface data of the data stored in the first RAM 204, and transfers the user interface data together with a drawing command to the graphics controller 210. In another example, when the projector 10 functions as a client of server base computing (SB), the first CPU 200 activates a corresponding client application and transmits a drawing command to the graphics controller 210 to generate user interface image data from input display image data having a specific format. The graphics controller 210 generates the user interface image data (hereinafter simply referred to as the 'image data') to be displayed from the user interface data or the display image data in response to the input drawing command, and stores the generated image data into the first frame memory 212 included in the graphics controller 210.

In response to an instruction output from the first CPU 200, the graphics controller 210 reads the image data from the first frame memory 212 of the graphics controller 210 at a preset timing and transfers the image data to the video signal conversion circuit 310 of the projector module 30. The first CPU 200 receives a command or data from the external input device 40 via the USBHUB 252, the USB controller 250, and the I/O port 230. The first CPU 200 may write the data stored in the first RAM 204 or the image data stored in the first frame memory 212 of the graphics controller 210 via the PC card interface controller 240 into the PC card 41.

When receiving image data from the graphics controller 210, the video signal conversion circuit 310 carries out the processing discussed above and transfers the processed image data to the LCD driving circuit 330. The LCD driving circuit 330 drives and controls the LCD 332 based on the input image data, and causes desired image data to be projected on the projection screen.

When data or a command transferred through the network line via the I/O port 230 represents an ON instruction of the light source 342, the second CPU 300 turns the light source 342 ON via the light source control circuit 340. The second CPU 300 regulates the working conditions (for example, the rotational speed and the rotational timing) of the cooling fan 352 via the cooling fan control circuit 350, based on the temperature of the light source 342. Namely the second CPU 300 controls the diverse operating conditions of the projector module 30 (for example, the brightness of display, the ON time of the light source 342, the working conditions of the cooling fan 352, and the working temperature) according to the data or the command transferred through the network line via the I/O port 230.

The data transmission from the projector 10 to the network line is carried out via the network interface controller 220, in response to an instruction output from the first CPU 200.

C. System Updating Control

The operating system (ASPOS 202b) stored in the first ROM 202 and the operating system (PJOS 302b) stored in the second ROM 302 may be updated in the following manner.

Figure 3:
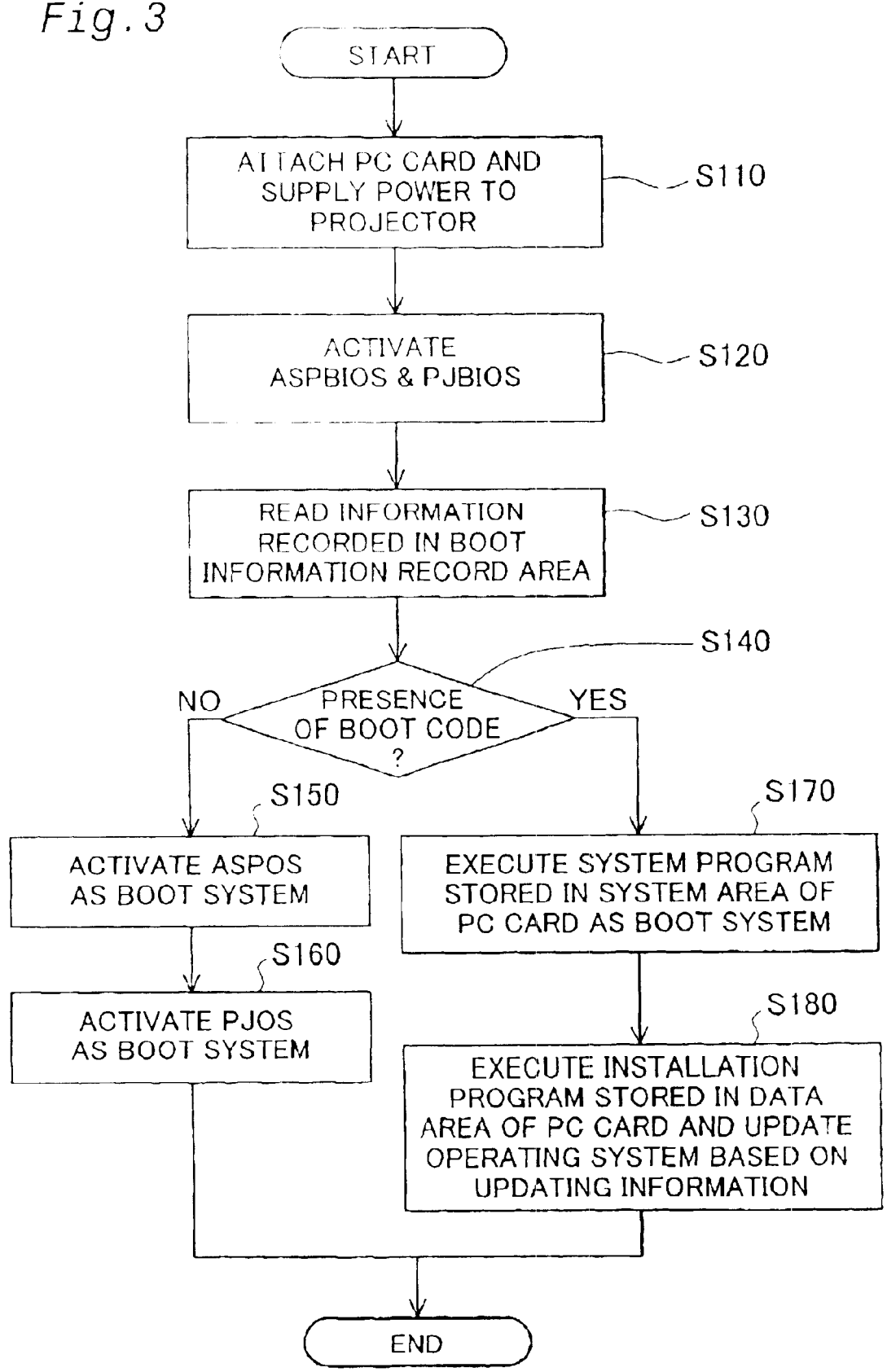
FIG. 3 shows a procedure of updating the system.

FIG. 3 shows a procedure of updating the system. At step S110, the user inserts (attaches) the PC card 41 into the card slot 242 (see FIG. 1) and supplies power to the projector 10. In response to the actuation of the projector 10, the ASPBIOS 202a stored in the first ROM 202 and the PJBIOS 302a stored in the second ROM 302 are activated at step S120. The PJBIOS 302a carries out a general initialization process and waits for activation of the PJOS 302b stored in the second ROM 302. The ASPBIOS 202a carries out a general initialization process and subsequently reads information recorded in a boot information record area set in the PC card 41 at step S130. The expression 'to supply power to the projector 10' means to enable execution of the basic input output system (that is, the ASPBIOS 202a and the PJBIOS 302a) after the attachment of the PC card. This is not restricted to the actual power supply to the projector but also includes an operation of pressing a reset button on the projector to reset the operations of the projector.

Figure 4:
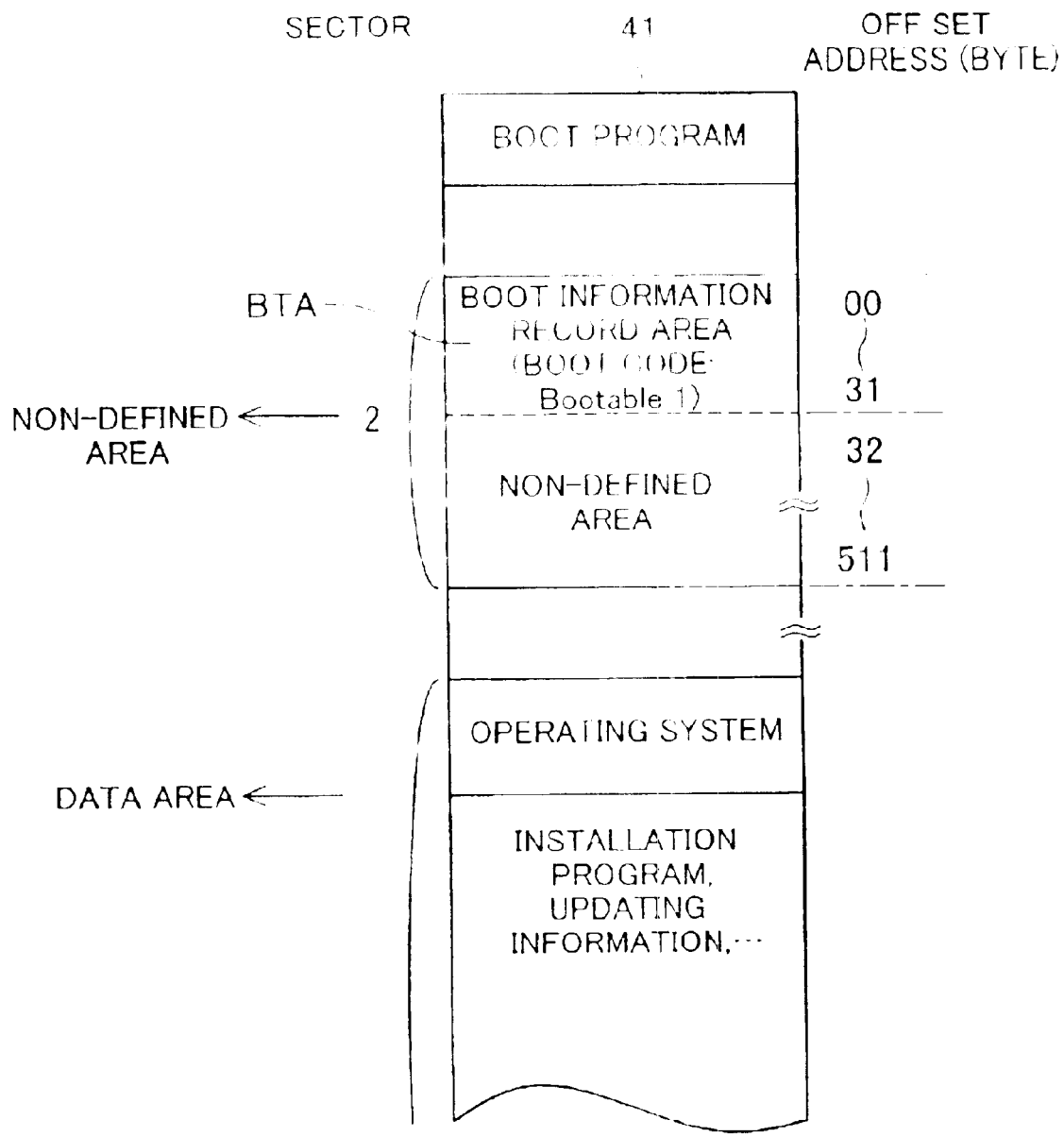
FIG. 4 illustrates the memory space of a PC card 41 as one example.

FIG. 4 illustrates the memory space of the PC card 41 as one example. As shown in FIG. 4, in the PC card of the ATA specification (PC card ATA) 41, a non-defined area (first 32 bytes in a second sector) is defined as a boot information record area BTA. A boot code (for example, 'Bootable') is recorded in this boot information record area BTA. A boot program is stored in a header area of the memory space, and an operating system as well as an installation program for system updating and updated information are recorded in a data area of the memory space.

Referring back to FIG. 3, the ASPBIOS 202a checks the boot information record area for the presence of the boot code at step S140. In the absence of the boot code in the boot information record area, the ASPOS 202b is activated as a boot system of the projector at step S150. At subsequent step S160, the first CPU 200 gives the second CPU 300 an instruction to activate the boot system, and the PJOS 302b is activated as the boot system. This starts the general operations of the projector. In the presence of the boot code (Bootable) in the boot information record area, on the other hand, the boot program recorded in the header area of the PC card 41 (see FIG. 4) is executed at step S170 to activate the operating system (system program) stored in the data area and control the operations of the projector. The installation program stored in the data area is executed for system updating at step S180. The operating systems (ASPOS 202b and PJOS 302b) stored in the first ROM 202 and the second ROM 302 are then updated, based on the updating information stored in the data area.

Detachment of the PC card 41 from the card slot 242 and re-actuation of the projector after completion of the system updating enables the updated ASPOS 202b and PJOS 302b to be activated and control the operations of the projector.

As clearly understood from the above explanation, the ASPBIOS 202a corresponds to the basic system of the present invention, whereas at least either one of the ASPOS 202b and the PJOS 302b corresponds to the first control system of the present invention. The operating system stored in the PC card 41 corresponds to the second control system of the present invention, and the PC card 41 corresponds to the mobile memory of the present invention.

As described above, in this embodiment, the operating system stored in the PC card 41 is activated by inserting the PC card 41, where the specific piece of information (that is, the boot code) is recorded in the specified boot information record area BTA, into the card slot 242 and supplying power to the projector 10. The operating system stored in the PC card 41 then controls the operations of the projector. Insertion of a conventional PC card without the specific information in the specified area and supply of power to the projector 10 does not allow execution of the operating system stored in the PC card. Namely such a conventional PC card can not actuate the projector. Only the specific PC card enables actuation of the projector.

The specified boot information record area BTA is not restricted to the non-defined area explained above, but it is preferable to set the boot information record area BTA in a generally non-writable area (that is, a write protection area). This application enables only authenticated users, who obtain permission to write data into the specified area, to prepare a PC card usable for actuation of the projector 10. This arrangement allows only the users having the specific PC card to control the operations of the projector 10 according to the operating system stored in the PC card. The arrangement thus effectively prevents any illegal user without the specific PC card from controlling the operations of the projector 10 according to any operating system that is different from the operating system (ASPOS 202b) stored in the first ROM 202 without permission.

The arrangement of storing the installation program and the system updating information in the PC card as discussed in the embodiment readily attains the system updating by simply inserting the PC card 41 into the card slot 242 and actuating the projector.

In the above embodiment, the system stored in the PC card 41 controls the projector 10 and updates the system stored in the projector 10. But the technique of the present invention is not restricted to the system updating process. The general application stores a diversity of programs and various pieces of information in a PC card usable for actuation of the projector and controls the projector according to any of such programs and information.

D. Modifications

The present invention is not restricted to the above embodiment and its applications, but there may be many modifications, changes, and alterations without departing from the scope or spirit of the main characteristics of the present invention. Some examples of possible modification are given below.

D1. Modification 1

The above embodiment regards the procedure of updating the ASPOS 202b or the PJOS 302b. One possible modification simultaneously updates the application programs 202c.

D2. Modification 2

In the above embodiment, the projector 10 has only one card slot 242 as shown in FIG. 1. The projector may be provided with multiple card slots, which enable insertion of multiple PC cards.

D3. Modification 3

In the above embodiment, the PC card of the ATA specification (the PC card ATA) according to the PCMCIA standard is used as the mobile memory of the present invention to update the system. Any of diverse memory cards in conformity with other standards may be applied for the mobile memory. In such cases, the projector should be provided with a controller corresponding to the selected standard. In another possible modification, the projector is provided with a driving unit, such as a floppy disk unit or a CD-ROM unit, and a floppy disk or a CD-ROM is used as the mobile memory.

D4. Modification 4

The above embodiment regards the structure including the two CPUs 200 and 300. One possible modification omits the second CPU 300, the second ROM 302, and the second RAM 304 and makes the first CPU 200 exert the functions of the second CPU 300.

D5. Modification 5

Part of the functions actualized by the hardware structure in the above embodiment may be attained by the software configuration. On the contrary, part of the functions attained by the software configuration in the above embodiment may be actualized by the hardware structure. For example, part of the functions of the two CPUs 200 and 300 (see FIG. 2) may be actualized by specific hardware circuits.

D6. Modification 6

The above embodiment regards the structure of the projector that utilizes a transmission-type liquid crystal panel. The technique of the present invention is also applicable to other types of projectors; for example, a projector utilizing a reflection-type liquid crystal panel, a projector utilizing micromirror devices (trade mark by Texas Instruments Inc.), and a projector utilizing a CRT.

Industrial Applicability

As described above, the projector of the present invention is effectively used to display images on the occasions of presentation and display a motion picture or a guidance film in airplanes and other public spaces.

What is claimed is:

1. A projector including a computer, the projector comprising:
   an internal storage device that stores therein a basic system, which is executed first by the computer on actuation of the projector, and a first control system that is activated through processing of the basic system to control operations of the projector; and
   a memory controller that reads information stored in a mobile memory,
   wherein, on actuation of the projector, the basic system reads information stored in a specific area of the mobile memory attached to the memory controller prior to activation of the first control system, identifies whether or not the information in the specific area is a specific piece of information, and, when the information in the specific area is identified as the specific piece of information, activates a second control system stored in the mobile memory, in place of the first control system, without transferring the second control system to the internal storage device wherein the second control system is an operating system.

2. A projector in accordance with claim 1, wherein the second control system updates the first control system stored in the internal storage device according to updating information for the first control system stored in the mobile memory, after activation of the second control system.

3. A projector in accordance with claim 2, wherein the specific area is set in a write protection area of the mobile memory.

4. A projector in accordance with claim 1, wherein the specific area is set in a write protection area of the mobile memory.

5. A projector in accordance with claim 4, wherein the specific area is set in a non-defined area in a specification of memory structure specified according to a type of the mobile memory.

6. A method of actuating a projector, the method comprising the steps of:
   on actuation of the projector, reading information stored in a specific area of a mobile memory attached to the projector, prior to activation of a first control system stored in an internal storage device of the projector for controlling operations of the projector;
   identifying whether or not the information in the specific area is a specific piece of information, and
   when the information in the specific area is identified as the specific piece of information, activating a second control system stored in the mobile memory, in place of the first control system, without transferring the second control system to the internal storage device wherein the second control system is an operating system.

7. A method in accordance with claim 6, the method further comprising the step of:
   updating the first control system according to updating information for the first control system stored in the mobile memory, after activation of the second control system.

8. A method in accordance with claim 7, the specific area is set in a write protection area of the mobile memory.

9. A method in accordance with claim 6, the specific area is set in a write protection area of the mobile memory.

10. A method in accordance with claim 9, wherein the specific area is set in a non-defined area in a specification of memory structure specified according to a type of the mobile memory.

11. A mobile memory detachably attached to a projector, the mobile memory having a data area that stores therein a second control system, which is capable of controlling operations of the projector, in plane of a first control system stored in an internal storage device of the projector for controlling the operations of the projector,
    the mobile memory further having a specific area that stores therein a specific piece of information, which is read out prior to activation of the first control system on actuation of the projector and directs to activate the second control system in place of the first control system, without transferring the second control system to the internal storage device wherein the second control system is an operating system.

12. A mobile memory in accordance with claim 11, wherein the specific area is set in a write protection area of the mobile memory.

13. A mobile memory in accordance with claim 12, wherein the specific area is set in a non-defined area in a specification of memory structure specified according to a type of the mobile memory.

* * * * *